UNITED STATES PATENT OFFICE.

WILLIAM W. HOUT, OF CORTLAND, NEW YORK.

WELDING-FLUX.

1,131,521. Specification of Letters Patent. Patented Mar. 9, 1915.

No Drawing. Application filed June 23, 1914. Serial No. 846,876.

*To all whom it may concern:*

Be it known that I, WILLIAM W. HOUT, a citizen of the United States, residing at Cortland, in the county of Cortland and State of New York, have invented new and useful Improvements in Welding-Flux, of which the following is a specification.

This invention relates to a welding-flux adapted for use in joining or welding pieces of metal and separate parts of implements, and particularly to a welding-flux of the character disclosed in my prior Patent No. 759,526, dated May 10, 1904.

In my prior patent referred to I set forth a welding-flux consisting of calcined borax, iron or steel filings, drillings or cuttings, furnace dross, slag or cinders, and calcined marble-dust, such composition providing a flux which will firmly cling to hot iron or steel during the heating operation preliminarily pursued previous to welding, and also firmly adhere to the metal while in the fire and resist displacement by the blast of a forge or furnace, and which further also obviates an objection present in using other fluxes on metal heated in forges—namely in preventing sparks from flying from the iron or steel.

The present invention is designed to provide a welding flux or composition which secures these advantages to a still greater degree, and which is superior to the aforesaid patented flux for use under some conditions, in obviating any slight tendency of the flux, due to the presence of borax, to roll off and separate from the metal, particularly in shifting or turning the metal over in a furnace, and, furthermore, to provide a welding flux which is self cleansing.

The improved compound or flux consists of boracic acid, calcined borax, iron or steel filings, drillings, turnings or cuttings, furnace dross, (slag or cinder), and calcined or burned marble-dust. The above-named substances may be varied in proportions in accordance with the character of the metal or metals to be welded and the prevailing contingencies or conditions present during the welding operation. For all practical purposes it has been found generally that the proportions most effective are as follows:—
Boracic acid, 7%; calcined borax 2½%; iron or steel filings, drillings, turnings or cuttings, 45%; furnace dross, 37%; and calcined marble-dust, 8½%.

Under some conditions the use of the borax in the combination is advantageous, but in some cases it may be omitted. The use of boracic acid, alone or in conjunction with borax, in combination with the calcined marble dust is of peculiar advantage and importance, as it obviates the necessity of fusing the mixture in order to secure a uniform mixture. The combination described provides a uniform mixture without fusing, thus avoiding this expensive step.

Boracic acid is an essential ingredient in effecting the compound, and in its practical effect is materially distinguished from ordinary borax in view of the absence of moisture therein and the necessity in the flux compound for welding purposes that there be no moisture present. It is also superior to calcined borax, in that it causes the particles of the welding compound to adhere still more closely to the metal or metals, and obviates even any tendency of the compound to roll off or become loosened in the fire in shifting or turning the metal or metals over in order to expose the same more fully to the heat, which objection is present under some conditions and in welding certain metals in the use of calcined borax alone. The calcined marble-dust is burned until it gets red-hot and allowed to cool off before it is mixed with the other ingredients. By calcining old marble, which has been exposed for a considerable time to the atmosphere, the original, somewhat impure calcium carbonate (old marble) is converted into calcium oxid (common lime), with the liberation of carbonic acid gas, such impurities as originally existed in the marble (traces or small amounts of silica, alumina, magnesium, etc.) existing finally in the lime formed. Owing to disintegration due to long exposure to the atmosphere, old marble forms a slightly more pulverulent oxid than new or sheltered marble and forms it somewhat more readily. At an intense heat, in the presence of finely divided metals or metallic oxids, this calcium oxid will partially combine with the former, thus facilitating the fluxing action. The calcined marble-dust furthermore holds the ingredients of the mixture intact when the flux is placed on the red-hot iron or steel and also prevents the remaining ingredients from falling under the blows of the hammer, due to the fact that such dust clings to the metal and absorbs what moisture there may be in the other ingredients, thus preventing sparks from flying. The dross, furnace cinder or slag used in the compound and considered to be one of the principal ingredients is the melted refuse or waste of refining from open hearth furnaces producing horse-shoe iron. This slag is crushed, sifted and cleaned to a proper degree of fineness. The drillings, turnings or cuttings are first prepared for use by heating the same in a closed furnace to cleanse the iron and consume the sulfurous gases, thus eliminating the sulfur which is injurious and causes a cold shut or flaw in the weld. By using this character of iron or steel waste in such condition, in connection with the cinder or slag, a superior weld is produced. All the above ingredients are reduced by grinding or milling to the desired fineness and thoroughly mixed together; and again run through a mill with special made burs, which completes the process.

In the use of the flux the pieces of iron, steel, or other metal to be welded are heated red-hot or to a color usually adopted in welding operations and plunged into the flux, the latter adhering to the metal-like wax. In some instances the flux may be sprinkled or dusted over the heated metal to be welded, and in either form of application the flux on the metal when the latter is returned to the fire and subjected to a blast will remain intact with the metal.

The advantage of the present compound over my prior compound and others heretofore in use is that it produces a satisfactory flux under all conditions, and at the same time obviates any tendency, even when the work is roughly handled or subjected to a blast or blows of it coming loose from the metal, whereby a less amount of the compound is required in the fluxing action. Furthermore, by the use of boracic acid rapid and complete fusion and combination with the iron or steel is obtained in such a manner as to unite the silicas present in the mass to secure a uniform combination, as well as to adapt the compound to flux at a low heat and cleanse itself without mechanical means, after the weld is made.

I claim:—

A welding flux or compound consisting of boracic acid; iron or steel particles; furnace dross, and calcined marble-dust.

In testimony whereof I affix my signature in presence of two witnesses.

WILLIAM W. HOUT.

Witnesses:
MARY K. O'NEIL,
JAMES F. DOUGHERTY.